Patented Mar. 24, 1931

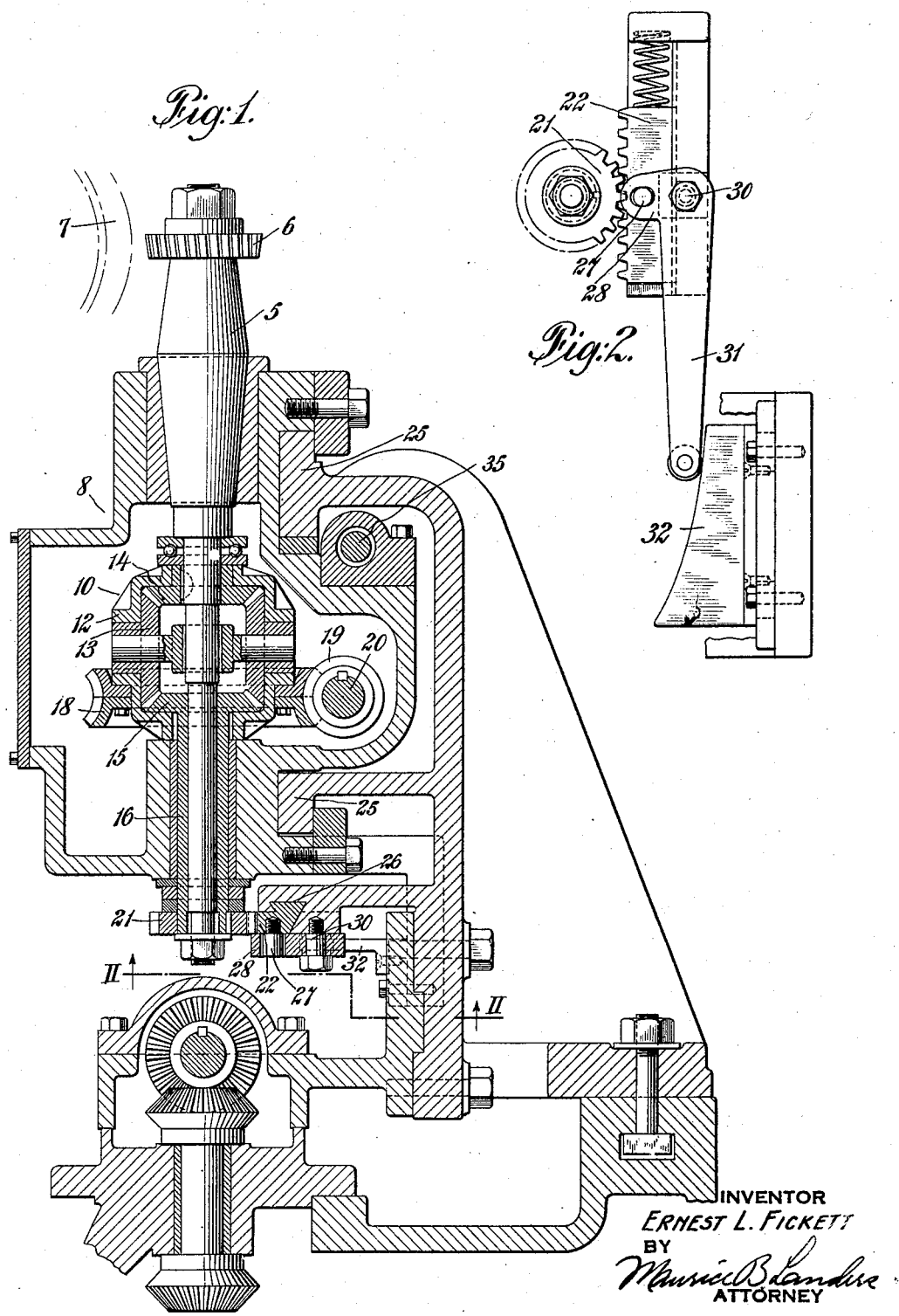

1,797,227

UNITED STATES PATENT OFFICE

ERNEST L. FICKETT, OF FITCHBURG, MASSACHUSETTS, ASSIGNOR, BY MESNE ASSIGNMENTS, TO SCURLOCK GEAR CORPORATION, OF NEW YORK, N. Y., A CORPORATION OF NEW YORK

GEAR-CUTTING APPARATUS

Application filed March 15, 1929. Serial No. 347,224.

The present invention has for an object to provide an improved gear cutting machine. The invention has been developed in connection with the design of a machine of the general character of that shown in my prior application for Letters Patent for machine for cutting spiral bevel gears, Ser. No. 98,901, filed March 31, 1926, and for convenience of disclosure such an embodiment will be more particularly described, but it will be understood that the particular description is illustrative merely and is not intended as defining the limits of the invention, the principles of which may be variously applied.

When cutting spiral bevel gears by means of a toothed cutter which rotates in synchronism with the work blank and is fed along the face of the blank, it is necessary that the rotation of the cutter be controlled in accordance both with the relative number of teeth on the cutter and to be cut on the blank and also in accordance with the angle of the teeth and the rate of feed of the cutter along the face of the blank. When cutting gears, the teeth of which follow an Archimedean spiral, the feed of the cutter and the rate of rotation of the cutter and the blank may remain constant during the whole of the cutting operation, but when it is desired to cut a spiral bevel gear on, for example, a logarithmic spiral or an involute spiral, variation must be obtained.

The calculation of the ratio of drive for the cutter and work spindles in which the speed of drive of both is taken care of in one set of change speed gears is somewhat complicated and involves somewhat troublesome calculation both to obtain the desired ratios accurately and also to obtain a ratio which can be readily obtained by gears of convenient sizes. The present invention provides an arrangement whereby the change speed gears can be of the ratio of the number of teeth in the cutter and work respectively and the additional rotation of the cutter and variation in the speed of rotation of the cutter can be obtained by superimposing an additional motion of rotation onto the cutter through a differential mechanism. By this arrangement the two motions which are, in effect, added together to rotate the cutter at the necessary speed can both be easily calculated and obtained through simple mechanisms.

The nature and objects of the invention will be better understood from the description of an illustrative embodiment for the purpose of which description reference should be had to the accompanying drawings in which—

Figure 1 is a detail sectional view of a portion of a cutter driving mechanism embodying the invention, and Figure 2 is a bottom plan view of a cam and rack mechanism.

The apparatus shown for the purposes of illustrating the principles of the invention comprises a cutter spindle 5 arranged to carry a gear cutter 6 for operating upon a gear blank 7 suitably rotated in the machine. The cutter spindle is rotatably mounted in a carriage 8 by which it is moved across the face of the gear blank and it is driven through a differential mechanism 10 actuated from two sources, the actual rotation of the cutter depending upon the resultant of these two actuations.

As shown, the differential mechanism comprises a planet carrier 12 rotatably mounted on the cutter spindle and carrying planet pinions 13 engaging a driven gear 14 keyed to the spindle and a sun gear 15 loose on the spindle and having a sleeve 16 extending downwardly through the base of the carriage. The planet carrier is actuated through a worm wheel 18 and worm 19 on the splined shaft 20, the worm wheel being driven at a rate of speed depending upon the rate of rotation of the blank and the relative number of teeth on the blank and cutter but is independent of the character of spiral or the angle of the teeth of the gear to be cut. The gear 15 is actuated through a gear 21 keyed to the lower end of the sleeve 16 and engaging a relatively stationary rack 22 mounted in the frame of the machine. The pitch diameter of the gear 21 is equal to the pitch diameter of the gear cutter 6 and the rack 21 and the gear blank to be cut are on opposite sides of the axis of the spindle thus providing the desired motion through the differential.

If the rack 22 is held stationary, rotation of the gear 21 by movement of the carriage to carry the cutter across the face of the blank will cause a correct rotation of the cutter for Archimedian spiral gear teeth. If, however, a different spiral is desired, the rack 22 should be given a longitudinal movement to effect the desired rotation of the cutter. As shown, this is accomplished by an arrangement whereby the movement of the carriage on the ways 25 on which it is mounted causes a longitudinal movement of the rack on its ways 26. A pin 27 projecting downwardly from the rack engages a slot in the arm 28 of a bell crank lever pivoted at 30 and the arm 31 of the same lever engages a cam 32 mounted on the carriage and movable therewith. The cam is designed in accordance with the particular spiral of the gear to be cut.

The operation of the compound driving mechanism will best be understood from the following analysis. If the cutter spindle carriage is stationary and the gear blank and cutter rotated the cutter 6 will be rotated in meshing timed relation by the worm 19 and worm wheel 18, the rack engaging gear 21 remaining stationary; but if the completely cut finished gear is held stationary and the cutter spindle carriage moved to carry the cutter across the face of the gear, the rack 22 and gear 21 will cause a suitable meshing rotation of the cutter 6 as it traverses the face of the gear, the worm wheel 18 remaining stationary. It follows, therefore, that during the cutting operation the desired rotation of the cutter relative to the blank will be maintained whether the carriage is moved at a uniform rate as by the feed screw 35 or by a cam giving a variable speed movement.

It will be understood that the foregoing particular description is illustrative merely and that the invention may be variously embodied.

I claim:

1. In a machine for cutting spiral bevel gears, in combination, a rotatable cutter, a movable carriage in which said cutter is rotatably mounted for movement across the face of a gear blank, and means for rotating the cutter comprising a differential mechanism and two actuating means for driving the differential mechanism, one of said actuating means comprising a relatively stationary rack and a pinion mounted on the carriage and engaging said rack for actuation of the pinion during the movement of the carriage.

2. In a machine for cutting spiral bevel gears, in combination, a rotatable cutter, a movable carriage in which said cutter is rotatably mounted for movement across the face of a gear blank, and means for rotating the cutter comprising a differential mechanism and two actuating means for driving the differential mechanism, one of said actuating means comprising a relatively stationary rack and a pinion mounted on the carriage and engaging the rack together with means for giving the rack a limited longitudinal movement during movement of the carriage.

3. In a machine for cutting spiral bevel gears, in combination, a rotatable cutter, a movable carriage in which said cutter is rotatably mounted for movement across the face of a gear blank, and means for rotating the cutter comprising a differential mechanism and two actuating means for driving the differential mechanism, one of said actuating means comprising a relatively stationary rack, a pinion mounted on said carriage and engaging the rack, a cam mounted on the carriage and means controlled by the cam for moving the rack longitudinally.

4. In a machine of the class described a cutter, means for shifting said cutter bodily, means for simultaneously rotating said cutter about its own axis, a plurality of independent driving means for said second mentioned means adapted to produce their combined effect thereon, and a common operating mechanism for said first mentioned means and said driving means, one of said driving means being controlled by a cam.

In testimony whereof, I have signed my name to this specification this 8th day of March, 1929.

ERNEST L. FICKETT.